United States Patent
Hettler et al.

(10) Patent No.: US 10,908,371 B2
(45) Date of Patent: Feb. 2, 2021

(54) TRANSISTOR OUTLINE PACKAGE AND METHOD FOR PRODUCING A TRANSISTOR OUTLINE PACKAGE

(71) Applicant: Schott AG, Mainz (DE)

(72) Inventors: Robert Hettler, Kumhausen (DE); Georg Mittermeier, Landshut (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 16/359,577

(22) Filed: Mar. 20, 2019

(65) Prior Publication Data
US 2019/0293882 A1    Sep. 26, 2019

(30) Foreign Application Priority Data

Mar. 20, 2018   (DE) .......................... 10 2018 106 504

(51) Int. Cl.
*G02B 6/42* (2006.01)
(52) U.S. Cl.
CPC ......... *G02B 6/4263* (2013.01); *G02B 6/4206* (2013.01); *G02B 6/4237* (2013.01)
(58) Field of Classification Search
CPC ............................ G02B 6/4237; G02B 6/4263
See application file for complete search history.

(56) References Cited

U.S. PATENT DOCUMENTS

| | | | |
|---|---|---|---|
| 6,035,664 A * | 3/2000 | Hashizume | G02B 6/4204 385/92 |
| 6,409,398 B2 * | 6/2002 | Nakaya | G02B 6/4204 385/33 |
| 6,843,609 B2 | 1/2005 | Yonemura | |
| 2001/0048794 A1 | 12/2001 | Nakaya et al. | |
| 2002/0114593 A1 * | 8/2002 | Terada | G02B 6/4225 385/93 |
| 2008/0025678 A1 | 1/2008 | Yabe | |
| 2015/0085388 A1 | 3/2015 | Matsusue et al. | |
| 2017/0294390 A1 | 10/2017 | Heftier et al. | |

FOREIGN PATENT DOCUMENTS

CN           201311504 Y      9/2009

* cited by examiner

*Primary Examiner* — Omar R Rojas
(74) *Attorney, Agent, or Firm* — Taylor IP, P.C.

(57) ABSTRACT

A transistor outline (TO) package including a header with at least one optoelectronic device. The header is bonded to a pot-shaped metal cap, which has a window that is transmissive to electromagnetic radiation, such that the at least one optoelectronic device is arranged in a hermetically sealed interior. The wall of the metal cap has at least one lateral wall portion and/or end wall portion which is thickened towards the interior compared to a portion of the lateral wall of the metal cap adjacent to the header.

17 Claims, 4 Drawing Sheets

TRANSISTOR OUTLINE PACKAGE AND METHOD FOR PRODUCING A TRANSISTOR OUTLINE PACKAGE

BACKGROUND OF THE INVENTION

1. Field of the Invention

The present invention relates to a Transistor Outline (TO) package and to a method for producing such a package. Furthermore, the present invention relates to an assembly comprising a TO package and a metal cap for a TO package.

2. Description of the Related Art

In fiber optic transmission technology, a light-conducting fiber, in particular a glass fiber, has to be mounted in front of a corresponding optical system with high dimensional accuracy in order to ensure good injection of light into the fiber core. This is in particular true for single-mode fibers which have a light-conducting core with a diameter of only about 9 μm. The relationship of the components to each other must not change or only very little later, during operation.

Known from practice are hermetically sealed TO packages consisting in particular of a deep-drawn metal cap which is bonded, by welding or soldering, to a header which carries the receiving or transmitting diode.

The TO package has a window, in particular in the form of a lens. In order to ensure injection into a light-conducting fiber, it is known from practice to first connect the housing to a coupling unit known as optical sub-assembly. The optical sub-assembly may either itself serve as a coupling element to the light-conducting fiber or may itself contain a light-conducting fiber into which light is injected and from which light is emitted, and which is then coupled, for example via a plug-in coupling, to the light-conducting fiber which transfers the data signal over long distances.

The optical sub-assemblies for multimode fibers usually come in the form of polymer injection molded parts. Such a polymeric optical sub-assembly is not very suitable for single-mode fibers, already because of the different coefficients of linear thermal expansion of the polymer compared to the metal housing in which the diode is arranged.

For single-mode fibers, it may be advantageous if the optical sub-assembly comprises a metal housing and if the latter is welded to the TO package. This provides an assembly which guarantees high dimensional accuracy between the TO package and the optical sub-assembly.

However, an issue hereof is that stresses are introduced into the housing material by the welding, in particular by laser welding, which in turn cause a change in geometry, at least after cooling. This is especially true in view of the fact that the housing wall of a deep-drawn cap of a TO package is usually quite thin, so that, moreover, there is also a risk for the housing wall to be perforated during welding, so that the hermetic sealing of the housing is lost. However, it is not readily possible to increase the wall thickness, since this would change the geometry of the housing so that it no longer corresponds to the standard type housings used in practice.

According to the teachings of document CN 2013 11504 Y, it is therefore contemplated for the optical sub-assembly to not be welded to the cap of the TO package, but instead to weld an adapter ring to the header of the TO package, which in turn is connected to the optical sub-assembly. This procedure is complicated and results in the fact that due to the existing adapter ring, the combination formed by the TO package and the optical sub-assembly is no longer compatible with the previously used design types. Furthermore, the adapter ring as an additional component introduces additional dimensional and positional tolerances into the system, which in turn may influence the alignment of the fiber end with respect to the light spot to be injected.

What is needed in the art is a TO package which allows for improved options of welding an optical sub-assembly thereto, but which otherwise is compatible with various design types.

SUMMARY OF THE INVENTION

The present invention relates to TO packages which are used on a transmitter side, i.e. to TO packages which are used to convert an electrical signal into a light signal to be injected into a light guide. In particular, the invention relates to a TO package that is designed for injecting light into a single-mode fiber.

The present invention provides a TO package, an assembly comprising a TO package, a metal cap for a TO package, and a method for manufacturing a TO package.

The invention relates to a Transistor Outline (TO) package which includes a header with at least one optoelectronic device. In particular, an emitter, more particularly an edge emitter, and a monitor diode are disposed on the header. The edge emitter may in particular be aligned in a 90° angle upwards, i.e. turned towards a window of the TO package. An edge emitter with a 45° mirror may be used as the emitter as well.

In order to be able to electrically connect the electronic and optoelectronic devices arranged on the header, the header comprises electrical feedthroughs which extend in particular from an upper surface to a lower surface thereof and may be provided in the form of glass-sealed connection pins. The header is preferably made of a metal, however, according to another embodiment of the invention it may likewise be made of a ceramic.

The header is bonded to a pot-shaped metal cap. The pot-shaped metal cap has a preferably flat base which defines the end wall of the TO package and from which a lateral wall extends. The metal cap in particular has a circular cylindrical cross-sectional shape, however, according to another embodiment of the invention, it may also have an oval cross-sectional shape. Also, the lateral wall may taper.

The metal cap comprises a window which is transmissive to electromagnetic radiation and is in particular in the form of a lens.

The window, or the lens, is in can be a glass window or glass lens, which is secured in a central opening of the metal cap in the end wall thereof by way of a glass solder.

Metal cap and header are bonded to one another in particular by welding or soldering. As a result, a hermetically sealed interior is formed, in which the optoelectronic device is arranged.

The metal cap is in particular provided in the form of a deep-drawn metal cap.

According to the invention, the wall of the metal cap comprises at least one lateral wall portion and/or end wall portion which is formed with an increased thickness towards the interior, compared to a portion of the lateral wall of the metal cap adjacent to the header.

Thus, adjacent to the header the metal cap comprises a portion of the lateral wall which has a smaller wall thickness than a more distal portion of the lateral wall and/or of the end wall. The transition area where the wall thickness increases, in particular in stepped manner, is in the interior of the TO package.

In this way, a metal cap can be provided which is similar to design types already known from the prior art in terms of its external dimensions, in particular in terms of its diameter, but which has its wall thickened on the end side thereof and/or in a portion of the lateral wall such that an optical sub-assembly made of metal can be welded thereto in a simple manner, in particular by laser spot welding, without incurring the risk of perforating the housing wall of the metal cap of the TO package.

At the same time, mechanical stability is enhanced by the thickened portion, so that the stress introduced into the material of the housing by the welding is reduced.

Geometric properties appear moreover to be improved by the fact that mechanical stresses can be absorbed by the thinner wall thickness in the vicinity of the header.

Furthermore, during operation, heat transfer towards the end wall is reduced due to the thinner wall thickness in the vicinity of the header, which also contributes to a reduction in geometric deficiencies caused by thermal deformations.

Preferably, the thickened lateral wall portion and/or end wall portion has a wall thickness which is at least 1.2 times, preferably at least 1.5 times, and/or less than 5 times that of the metal cap portion adjacent to the header.

Furthermore, it is preferably contemplated that the portion of the lateral wall adjacent to the header has a wall thickness of 0.10 to 0.25 mm, whereas the thickened lateral wall portion and/or end wall portion has a thickness of 0.3 to 1.0 mm.

In one embodiment of the invention, the base surface of the header, that is to say the upper surface of the header on which at least the optoelectronic device is mounted, is spaced from a transition area of the lateral wall of the metal cap where the wall thickness changes.

Therefore, the header bonded to the metal cap does not fill the entire range in which the lateral wall is thinner, but rather terminates in the portion having a smaller wall thickness.

As a result, heat transfer towards the end wall is reduced, and hence also towards the optical sub-assembly.

Furthermore, the surface area of the upper surface of the header, which is available for electronic devices to be mounted thereon does not change.

Thus, according to a further embodiment of the invention, it is contemplated that an electronic device disposed on the header protrudes below the transition area.

The transition area in which the wall thickness increases is in particular implemented as a step in the housing wall located above the upper surface of the header. Below this step it is possible to arrange an electronic device or a portion of an electronic device, in particular also an electrical contact of an electronic device.

The metal cap preferably has an outer diameter (measured adjacent to the end wall) of at least 2 mm, preferably at least 2.5 mm, and/or of at most 10 mm, preferably at most 4.5 mm.

The housing of the metal cap and/or the housing of the optical sub-assembly is preferably made of a material having a coefficient of linear thermal expansion a (averaged between 20 and 300° C.) of less than 14 ppm/K, more preferably less than 12 ppm/K.

The housing of the metal cap may in particular be made of an iron-nickel alloy or a nickel-cobalt alloy. Furthermore, the housing of the metal cap may be provided with an anti-corrosion coating, in particular a nickel- and/or gold-containing coating. Furthermore, ferritic stainless steels may also be used for the housing of the metal cap. Such steels have the advantage that they do not need to be coated with an anti-corrosion coating.

The housing of the optical sub-assembly may also be made of an iron-nickel alloy or a nickel-cobalt alloy.

Furthermore, stainless steels, in particular ferritic stainless steels may also be used for the housing of the optical sub-assembly. They have the advantage that they do not need to be coated with an anti-corrosion coating.

The window is preferably made of a glass which has a coefficient of linear thermal expansion a corresponding to 0.90 to 1.10 times the coefficient of linear expansion of the material of the metal cap.

According to one embodiment of the invention, the TO package is connected to an optical sub-assembly for connection of a single-mode fiber. The optical sub-assembly may comprise a single-mode fiber or may be connected to a single-mode fiber. This fiber in particular includes a light-conducting core with a diameter of less than 10 µm.

The TO package is in particular designed as a TO-41, TO-46, TO-38, or TO-56 type package.

The thickened portion of the lateral wall preferably extends over at least 30%, more preferably at least 50%, and/or over less than 90%, preferably less than 80% of the height of the lateral wall.

The invention furthermore relates to an assembly comprising a TO package as described above and an optical sub assembly connected to the TO package for connection of a light-conducting fiber, in particular a single-mode fiber.

A housing of the optical sub-assembly is welded to the metal cap at the thickened lateral wall portion and/or end wall portion.

It is in particular contemplated that a metal housing of the optical sub-assembly is bonded to the metal cap through a plurality of weld spots, in particular laser weld spots.

If the optical sub-assembly is bonded to the end wall, the weld spots can be distributed along a circle around a central axis of the metal cap.

If welded to the lateral wall, the housing of the optical sub-assembly may define a sleeve in which the metal cap is disposed, with a plurality of weld spots distributed around the sleeve.

In one embodiment of the invention, the metal cap and the housing of the optical sub-assembly are welded together by a plurality of weld spots, and the weld spots are distributed in an irregular manner around the circumference of the housing of the optical sub-assembly.

As will be explained in more detail below, the setting of weld spots during test operation may be used to achieve a correction of dimensional and positional tolerances by the weld spots themselves, such that the light emitted from an emitter is focused onto the end of the light-conducting core of the optical fiber as an axially aligned spot.

This results in an irregularly distributed array of weld spots, so that the weld spots do not enclose the same angle between each other but are rather distributed around the circumference with different angular spacings to each other.

The present invention furthermore relates to a metal cap for the TO package as described above.

The metal cap may in particular have all the features described above in conjunction with the metal cap.

The metal cap comprises a pot-shaped housing, i.e. a housing of a preferably circular cylindrical shape, having a base which is referred to as end wall, in which an opening for the window is provided, and a circumferential lateral wall extending therefrom in only one direction.

The lateral wall has a lower portion having a smaller wall thickness compared to the portion of the lateral wall adjacent to the lower portion and/or compared to the end wall.

A transition area, in particular in the form of a step, where the wall thickness changes, is provided in the interior of the pot-shaped cap, preferably on the inner lateral surface thereof.

The present invention furthermore relates to a method for producing the TO package described above.

For this purpose, a blank for a metal cap is stamped out of a metal sheet and is embossed such that portions of different wall thickness and an opening are produced.

It is in particular contemplated to produce an annular precursor in a metal sheet, by embossing an outer area of the ring such that it has a smaller wall thickness than an inner area of the ring.

This precursor is deep-drawn into a metal cap at subsequent stations of the tool, and once deep-drawn, a window is placed in the opening, in particular a lens.

According to another embodiment of the invention, the stamping, embossing, and deep-drawing is performed in the same tool.

It has been found that with a suitable tool it is possible to provide, in a single processing step, a pot-shaped metal cap which has a lower portion of the lateral wall that is thinner than a more distal portion of the lateral wall. This may in particular be achieved by stamping a ring out of a metal sheet in a first step and at the same time embossing it in such a way that an outer portion is made thinner. Subsequently, the ring may be deep-drawn into a metal cap, in particular a metal cap having a flange opposite the end wall, for example by a mandrel.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
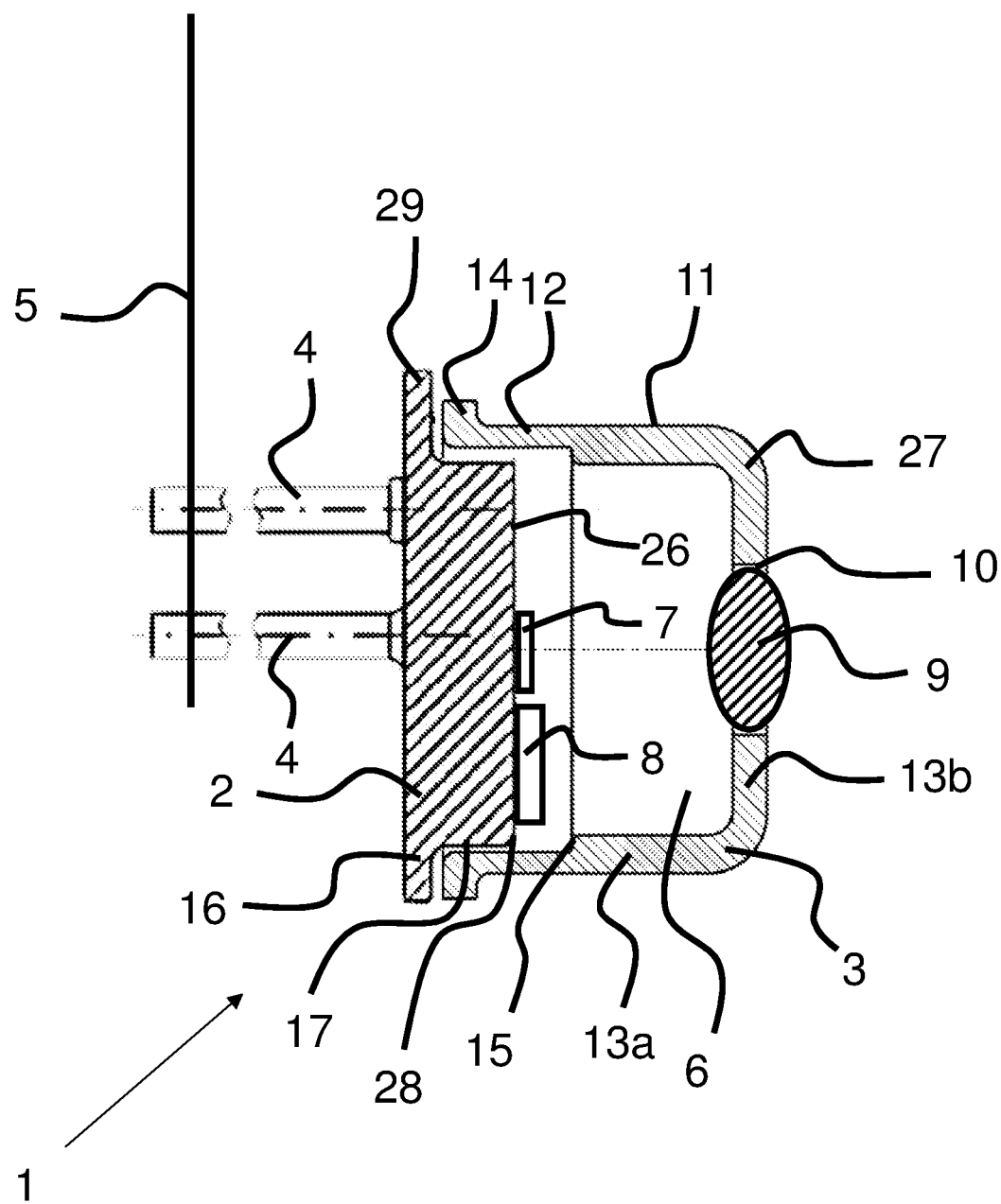
FIG. 1 shows a sectional view of an embodiment of a TO package according to the invention.

Referring now to the drawings, and more particularly to FIG. 1, there is shown a sectional view of an exemplary embodiment of a TO package 1 according to the present invention.

TO package 1 includes a header 2 with at least one optoelectronic device disposed on the upper surface 26 thereof.

In this exemplary embodiment, an emitter 7 is disposed on the header 2, which serves to convert an electrical signal into a light signal. Furthermore, a monitor diode 8 is disposed next to the emitter 7, which is used to control the output power of the emitter 7. The emitter 7 may in particular be implemented as an edge emitter with a mirror (not shown) rotated through 45° relative thereto.

Header 2 comprises a plurality of electrical feedthroughs, via which the emitter 7 and the monitor diode 8 are electrically connected. These feedthroughs extend out of the lower surface 16 of header 2 in the form of connection pins 4.

Connection pins 4 may be connected to a printed circuit board, in particular a flexible printed circuit board 5.

The header 2 may be equipped with an optoelectronic device, which is known per se from the prior art.

The header 2 is bonded to a metal cap 3 such that a hermetically sealed TO package 1 is formed, with the electronic devices arranged in the interior 6 thereof.

In particular, the header 2 may be soldered or welded to the lateral wall 11 of the metal cap in a bonding area 17, and/or with a flange 29 to a flange 14 of the metal cap 3.

The metal cap 3 has a pot-like shape and comprises an end wall 27 from which the lateral wall 11 extends.

Opposite end wall 27, the metal cap 3 has a laterally protruding flange 14 which serves for improved connection to the header 2 and improved mechanical stability.

The metal cap 3 has a substantially circular cylindrical shape and comprises a central opening 10 in which a window is arranged, in the present exemplary embodiment in the form of a lens 9. Lens 9 is in particular installed in an opening 10 of the end wall 27 by a solder glass.

In contrast to the prior art, metal cap 3 has a portion 12 of the lateral wall 11 at least partially adjacent to the header 2, compared to which a portion 13a of the lateral wall closer to the end wall 27 and the adjoining portion 13b of the end wall are formed with an increased thickness.

In this exemplary embodiment, a transition area 15 is located above the upper surface 26 of the header 2, in particular in the form of a step, where the wall thickness of the deep-drawn metal cap 3 increases. The outer dimensions of the metal cap 3 can correspond to a design type known from the prior art. Due to the increased wall thickness in portions 13a and 13b, mechanical stability is enhanced in these portions and an optical sub-assembly 20 can easily be bonded there by welding. At the same time, due to the thinner portion 12 of lateral wall 11 adjacent to the header 2, heat transfer toward the end wall 27 of the metal cap 3 is reduced.

Since the transition area 15 is spaced from the upper surface 26 of the header 2, an electronic device may be disposed in the area 28 below transition area 15. Therefore, the surface area on which electronic devices can be mounted on the upper surface 26 of header 2 is advantageously not reduced according to an embodiment of the invention. Furthermore, no modification of the header 2 is required, in particular in terms of its diameter, compared to the prior art.

Figure 2:
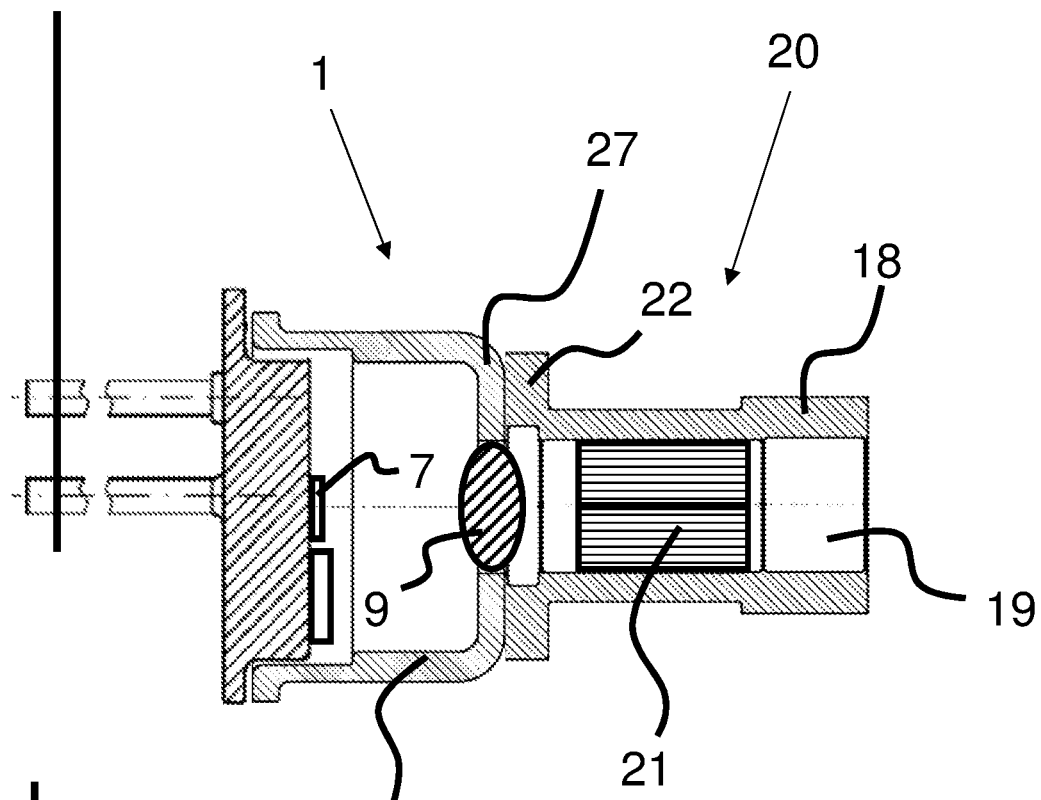
FIG. 2 illustrates how the TO package of FIG. 1 is connected to an optical sub-assembly. Here, the optical sub-assembly is bonded to the end wall of the metal cap of the TO package.

FIG. 2 is a schematic sectional view illustrating how the TO package 1 of FIG. 1 is bonded to an optical sub-assembly 20. Optical sub-assembly 20 comprises a housing 18 made of metal, which in this exemplary embodiment includes a light guide 21, preferably in the form of a single-mode fiber. More particularly, the light guide 21 is a single-mode fiber having an outer diameter from 50 to 250 μm, which is inserted in a ferrule, in particular a ceramic ferrule, and which serves for coupling purposes.

Optical sub-assembly 20 includes a flange 22 where the housing 18 is welded to the end wall 27 of TO package 1, which has the increased thickness. There is no need for a hermetic seal between TO package 1 and optical sub-assembly 20, rather, weld spots are sufficient to join these components.

In this exemplary embodiment of the invention, the lens 9 focuses the light emitted by the emitter 7 directly onto the end of the light-conducting core of light guide 21. Furthermore, in this exemplary embodiment, the optical sub-assembly 20 comprises a coupling portion 19 which serves to couple a light guide. Coupling portion 19 may in particular be in the form of a plug-in connector.

Figure 3:
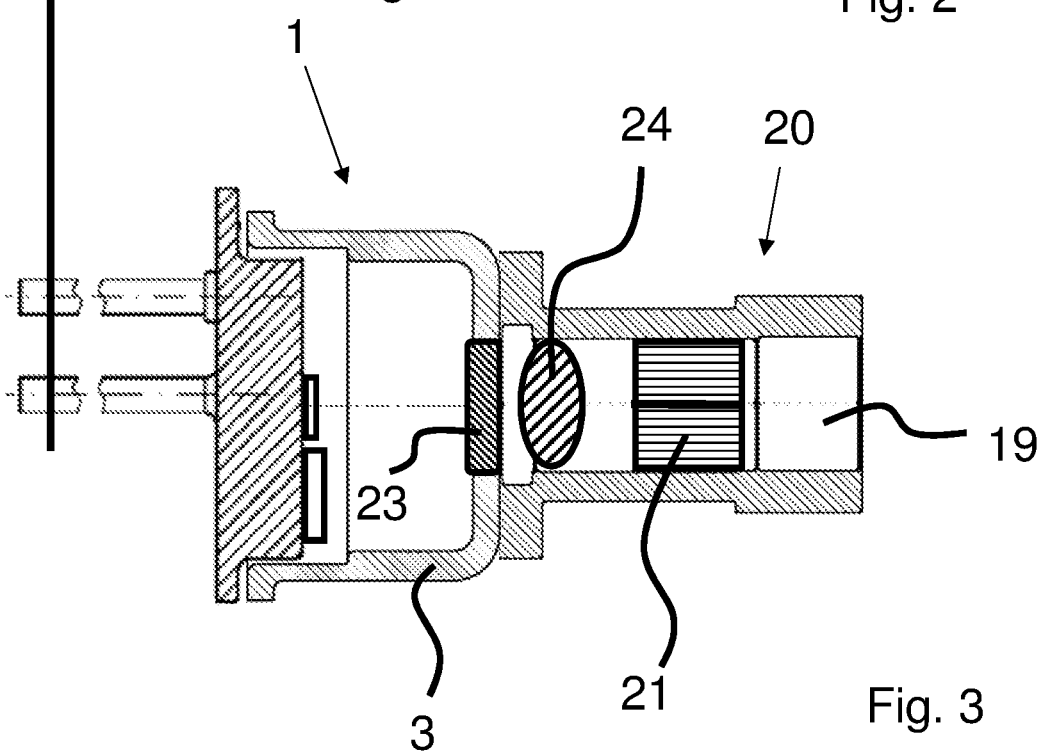
FIG. 3 shows an alternative embodiment to FIG. 2, in which the window of the TO package is in the form of a disc.

FIG. 3 shows an alternative embodiment of the invention, compared to FIG. 2. In contrast to the exemplary embodiment shown in FIG. 2, the cap 3 of TO package 1 is provided with a window not in the form of a lens, but in the form of a disc 23. Instead, the optical sub-assembly 20 includes a lens 24, which, in turn, focuses light onto the end of the core of light guide 21. Optical sub-assembly 20 also comprises a coupling portion 19.

Figure 4:
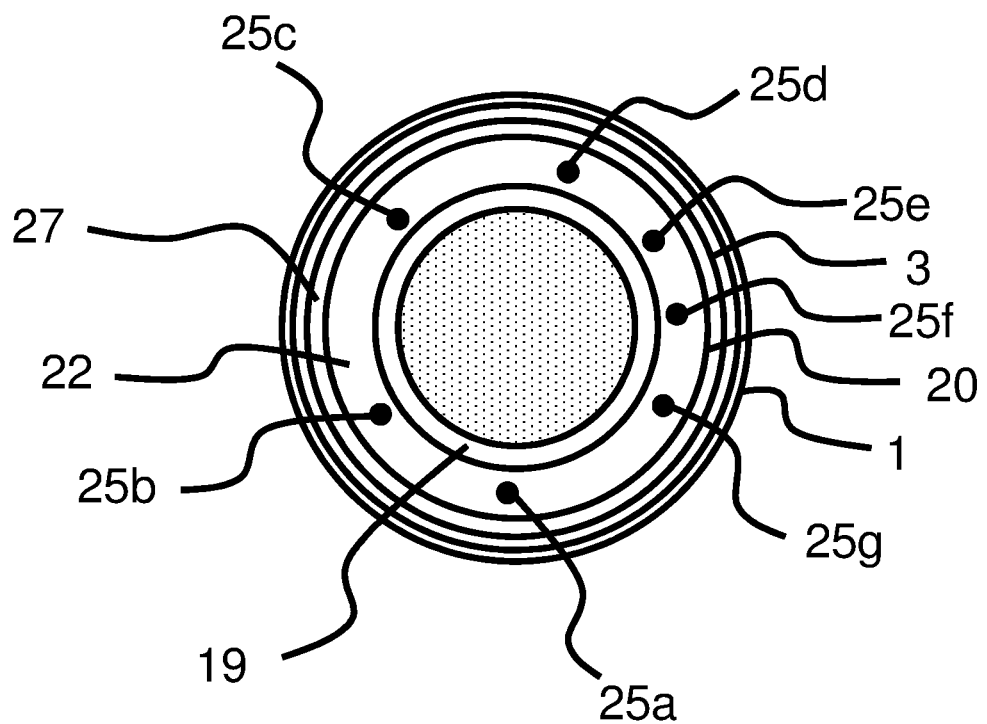
FIG. 4 is a plan view of the end face of the TO package according to FIG. 2 or FIG. 3 bonded to the optical sub-assembly.

FIG. 4 is a plan view of the end face of the assembly consisting of TO package 1 and optical sub-assembly shown in FIG. 2 or FIG. 3. It can be seen that the flange 22 of optical sub-assembly 20 is bonded to the end wall 27 of metal cap 3 by a plurality of weld spots 25a to 25g. Weld spots 25a to 25g are set during a test mode, while the monitor diode (8 in FIG. 1) verifies the efficiency of injection into the light guide 21.

Since stresses are introduced into the material by the weld spots 25a to 25g, due to thermal expansion and due to microstructural changes in the material, the weld spots 25a to 25g can be positioned so as to achieve fine alignment such that the spot projected onto the core of the fiber end through the lens 9, 24 is aligned axially to the core. Weld spots 25a to 25g are therefore distributed in an irregular manner, i.e. they enclose different angles to each other with respect to the central axis.

Figure 5:
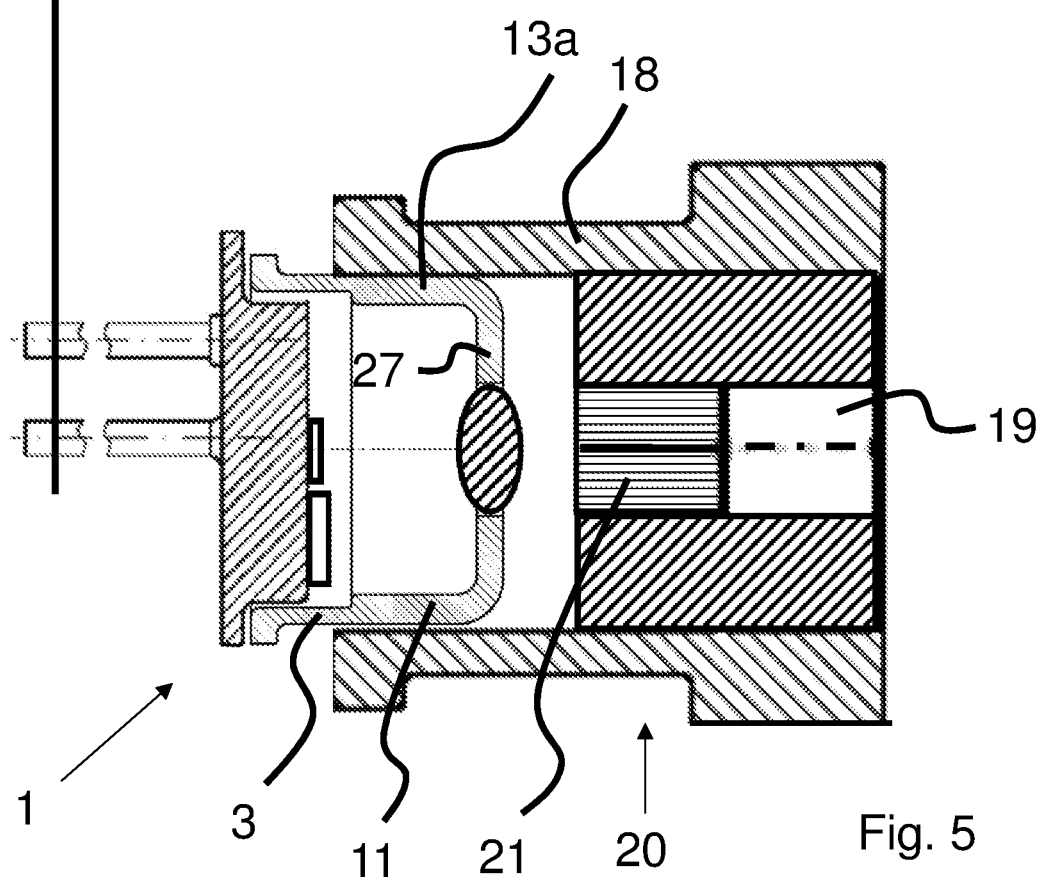
FIG. 5 is a sectional view of an alternative embodiment in which an optical sub-assembly is bonded to the lateral wall of the TO package.

FIG. 5 is a schematic sectional view of an alternative embodiment of the invention. According to this embodiment, an optical sub-assembly 20 is connected to a TO package 1, and here the optical sub-assembly is not bonded to the end wall 27 but to the lateral wall 11 of metal cap 3. The corresponding weld spots bonding the housing 18 to the cap 3 (not shown) are arranged in a thickened portion 13a of lateral wall 11.

The exemplary embodiment of an optical sub-assembly illustrated in FIG. 5 again comprises a light-conducting fiber 21 and a coupling portion 19 for connection to an optical transmission system. Preferably, coupling portion 19 comprises a ferrule with the light-conducting fiber inserted therein.

Figure 6:
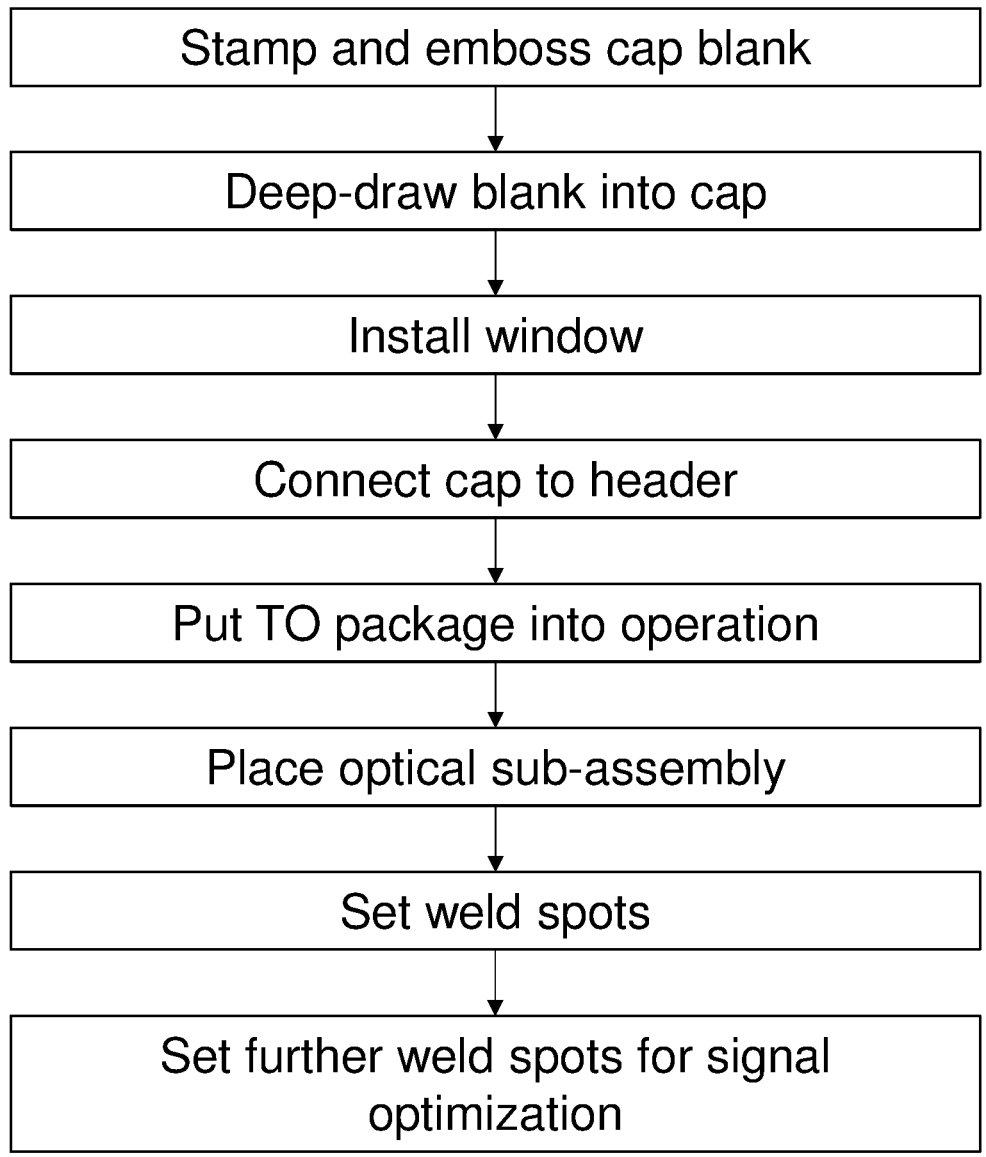
FIG. 6 is a flowchart of an exemplary embodiment illustrating the method steps for producing an assembly comprising a TO package and an optical sub-assembly.

Referring to the flowchart of FIG. 6, it will be explained how the TO packages 1 illustrated above can be manufactured. Initially, an annular blank for the metal cap 3 is stamped out of a metal sheet, in particular of a metal sheet made of a low expansion alloy, and is embossed such that an edge portion has a thinner wall thickness than the remaining area of the blank.

Subsequently, the blank is deep-drawn into a metal cap 3. The deep-drawing is preferably performed in the same tool as the stamping and embossing.

A window, which can be in the form of a lens 9, is installed in a central opening 10 of the cap and is secured therein, for example using a glass solder.

Then, the metal cap 3 is welded or soldered to the header 2, which header has already been equipped with an opto-electronic device. The welding is performed under protective gas and produces a gas-tight connection.

In order to connect the optical sub-assembly 20 to the TO package 1, the latter is first put into a test mode and connected to a measuring device for measuring the output power, via a light guide (not shown) coupled to the optical sub-assembly.

Optical sub-assembly 10 is placed and adjusted relative to the TO package 1 such that the output power emitted from the TO package 1 becomes maximal, which is continuously monitored by the measuring device. Then, weld spots are initially set to connect the optical sub-assembly 20 and the metal cap 3 to each other (e.g. the three weld spots 25a, 25c, and 25e which are regularly distributed around the circumference).

Subsequently, further weld spots 25b, 25d, 25f, 25g may be set in order to achieve fine adjustment of the components so as to optimize the signal.

The invention permits to provide a TO package which is used in particular for a transmitting diode in an optical data transmission network. The TO package allows for simplified attachment of an optical sub-assembly by welding, while the dimensions of known design types and the design of the header are retained.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 TO package
2 Header
3 Metal cap
4 Connection pin
5 Printed circuit board
6 Interior
7 Emitter
8 Monitor diode
9 Lens
10 Opening
11 Lateral wall
12 Portion of lateral wall adjacent to header
13a Thickened portion of lateral wall
13b Thickened portion of end wall
14 Flange
15 Transition area
16 Lower surface
17 Bonding area
18 Housing 19 Coupling portion
20 Optical sub-assembly
21 Light guide
22 Flange
23 Disc
24 Lens
25a-25g Weld spots
26 Upper surface
27 End wall
28 Area below transition area
29 Flange

What is claimed is:

1. A transistor outline package, comprising:
a header with at least one optoelectronic device;
a pot-shaped metal cap bonded to the header such that a hermetically sealed interior is formed, the at least one optoelectronic device being arranged in the interior, the metal cap including a window being transmissive to electromagnetic radiation and a wall having a lateral wall and an end wall, at least one of a portion of the lateral wall and a portion of the end wall being formed with an increased thickness towards the interior compared to a portion of the lateral wall adjacent to the header; and
an optical sub-assembly for connecting a light-conducting fiber, the optical sub-assembly including a housing with a circumference, the housing being bonded to the metal cap through a plurality of weld spots being distributed irregularly around the circumference of the housing.

2. The transistor outline package of claim 1, wherein at least one of the thickened lateral wall portion and the thickened end wall portion has a wall thickness which is at least 1.2 times that of the portion of the lateral wall adjacent to the header.

3. The transistor outline package of claim 1, wherein at least one of the thickened lateral wall portion and the thickened end wall portion has a wall thickness which is less than 5 times that of the portion of the lateral wall adjacent to the header.

4. The transistor outline package of claim 1, wherein the portion of the lateral wall adjacent to the header has a wall thickness of 0.10-0.25 mm, and wherein at least one of the thickened lateral wall portion and the thickened end wall portion has a wall thickness of 0.3-1.0 mm.

5. The transistor outline package of claim 1, wherein the metal cap includes a transition area of the lateral wall of the metal cap, at which a wall thickness of the wall changes, and an upper surface of the header is spaced from the transition area of the lateral wall of the metal cap.

6. The transistor outline package of claim 5, wherein the at least one optoelectronic device disposed on the header protrudes below the transition area.

7. The transistor outline package of claim 1, wherein the metal cap is in the form of a deep-drawn cap and the window is in the form of a soldered lens.

8. The transistor outline package of claim 1, wherein the metal cap has an outer diameter of at least one of at least 2 mm and at most 10 mm.

9. The transistor outline package of claim 1, wherein the light-conducting fiber is a single-mode fiber.

10. The transistor outline package of claim 9, wherein at least one of the metal cap and the housing of the optical sub-assembly is made of a material having a coefficient of linear thermal expansion a (averaged between 20 and 300° C.) of less than 14 ppm/K, and wherein the metal cap is made of an iron-nickel or nickel-cobalt alloy or of a ferritic stainless steel.

11. The transistor outline package of claim 1, wherein the transistor outline (TO) package is one of a TO-41, TO-46, TO-38, and TO-56 type package.

12. The transistor outline package of claim 1, wherein the thickened lateral wall portion at least one of extends over at least 30% and over less than 90% of a height of the lateral wall.

13. The transistor outline package of claim 1, wherein the window is arranged centrally in the end wall, and wherein the lateral wall includes a lower portion which has a smaller wall thickness compared to at least one of a portion of the lateral wall adjacent to the lower portion and the end wall.

14. An assembly, comprising:
a transistor outline (TO) package including a header with at least one optoelectronic device and a pot-shaped metal cap bonded to the header such that a hermetically sealed interior is formed, the at least one optoelectronic device being arranged in the interior, the metal cap including a window being transmissive to electromagnetic radiation and a wall having a lateral wall and an end wall, at least one of a portion of the lateral wall and a portion of the end wall being formed with an increased thickness towards the interior compared to a portion of the lateral wall adjacent to the header; and
an optical sub-assembly for connecting a light-conducting fiber, the optical sub-assembly including a housing with a circumference, the housing being welded to the metal cap at a location of at least one of the thickened portion of the lateral wall and the thickened portion of the end wall,
wherein the metal cap and the housing are bonded to each other through a plurality of weld spots that are distributed irregularly around the circumference of the housing.

15. The assembly of claim 14, wherein at least one of the thickened lateral wall portion and the thickened end wall portion has a wall thickness which is at least 1.2 times that of the portion of the lateral wall adjacent to the header.

16. The assembly of claim 14, wherein the metal cap includes a transition area of the lateral wall of the metal cap, at which a wall thickness of the wall changes, and an upper surface of the header is spaced from the transition area of the lateral wall of the metal cap.

17. The assembly of claim 14, wherein the metal cap is in the form of a deep-drawn cap and the window is in the form of a soldered lens.

\* \* \* \* \*

UNITED STATES PATENT AND TRADEMARK OFFICE
CERTIFICATE OF CORRECTION

PATENT NO. : 10,908,371 B2
APPLICATION NO. : 16/359577
DATED : February 2, 2021
INVENTOR(S) : Hettler et al.

It is certified that error appears in the above-identified patent and that said Letters Patent is hereby corrected as shown below:

On the Title Page

Under U.S. PATENT DOCUMENTS, at patent 2017/0294390, please delete "Heftier et al.", and substitute therefore --Hettler et al.--.

In the Specification

Column 3
At Line 60, please delete "expansion a", and substitute therefore --expansion α--.

Column 4
At Line 11, please delete "expansion a", and substitute therefore --expansion α--.

Signed and Sealed this
Twenty-fifth Day of October, 2022

Katherine Kelly Vidal
*Director of the United States Patent and Trademark Office*